(12) United States Patent
Ahmed

(10) Patent No.: US 11,103,105 B2
(45) Date of Patent: *Aug. 31, 2021

(54) COOKING GRATE WITH ADJUSTABLE HEATING CHARACTERISTICS

(71) Applicant: W.C. BRADLEY CO., Columbus, GA (US)

(72) Inventor: Mallik Ahmed, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 1042 days.

This patent is subject to a terminal disclaimer.

(21) Appl. No.: 15/222,617

(22) Filed: Jul. 28, 2016

(65) Prior Publication Data

US 2017/0027380 A1 Feb. 2, 2017

Related U.S. Application Data

(63) Continuation of application No. 13/708,626, filed on Dec. 7, 2012, now Pat. No. 9,427,108.

(51) Int. Cl.
 *A47J 37/06* (2006.01)
 *A47J 37/07* (2006.01)

(52) U.S. Cl.
 CPC ......... *A47J 37/067* (2013.01); *A47J 37/0786* (2013.01)

(58) Field of Classification Search
 CPC .................... A47J 37/067; A47J 37/0786
 See application file for complete search history.

(56) References Cited

U.S. PATENT DOCUMENTS

| | | |
|---|---|---|
| 1,591,568 A | 7/1926 | Simmons |
| 2,940,381 A | 6/1960 | Cottongim et al. |
| 3,092,015 A | 6/1963 | Tucker et al. |
| 3,443,510 A | 5/1969 | Norton |
| 4,403,541 A * | 9/1983 | Berger .............. A47J 37/067 29/433 |
| 4,492,215 A | 1/1985 | Digianvittorio |
| 4,553,523 A | 11/1985 | Stohrer, Jr. |
| 4,598,634 A | 7/1986 | Van Horn, II |
| 5,000,085 A | 3/1991 | Archer |
| 5,237,914 A | 8/1993 | Carstensen |
| 5,347,978 A | 9/1994 | Zuran |
| 5,355,780 A | 10/1994 | Campbell |

(Continued)

FOREIGN PATENT DOCUMENTS

DE 19633296 A1 * 2/1998 ............ A47J 37/067

OTHER PUBLICATIONS

PCT/US12/68597, International Search Report and Written Opinion; Applicant: W.C. Bradley Co.; dated Mar. 8, 2013.

*Primary Examiner* — Jorge A Pereiro
*Assistant Examiner* — Logan P Jones
(74) *Attorney, Agent, or Firm* — David G. Woodral; GableGotwals

(57) ABSTRACT

A multi-part cooking grate with a lower sub-grate with a first plurality of V-shaped cooking members running along a length of the lower sub-grate and having a first predetermined spacing between the first plurality cooking members along a width of the lower sub-grate, and an upper sub-grate with a second plurality of V-shaped cooking members running along a length of the lower sub-grate and having a second predetermined spacing between the second plurality of cooking members along a width of the upper sub-grate.

15 Claims, 18 Drawing Sheets

(56) References Cited

U.S. PATENT DOCUMENTS

| | | |
|---|---|---|
| 5,363,752 A | 11/1994 | Weil |
| 5,437,221 A | 8/1995 | Schwod |
| 7,241,466 B2 | 7/2007 | Dellinger |
| 7,810,487 B2 | 10/2010 | Johnston |
| 8,151,699 B2 | 4/2012 | Coutts |
| 9,427,108 B2 * | 8/2016 | Ahmed ................. A47J 37/067 |
| 2007/0125357 A1 | 6/2007 | Johnston |
| 2009/0173332 A1 | 7/2009 | Lott |
| 2009/0308374 A1 | 12/2009 | Ahmed |
| 2010/0212515 A1 | 8/2010 | Coutts |
| 2012/0222665 A1 | 9/2012 | Ahmed |

* cited by examiner

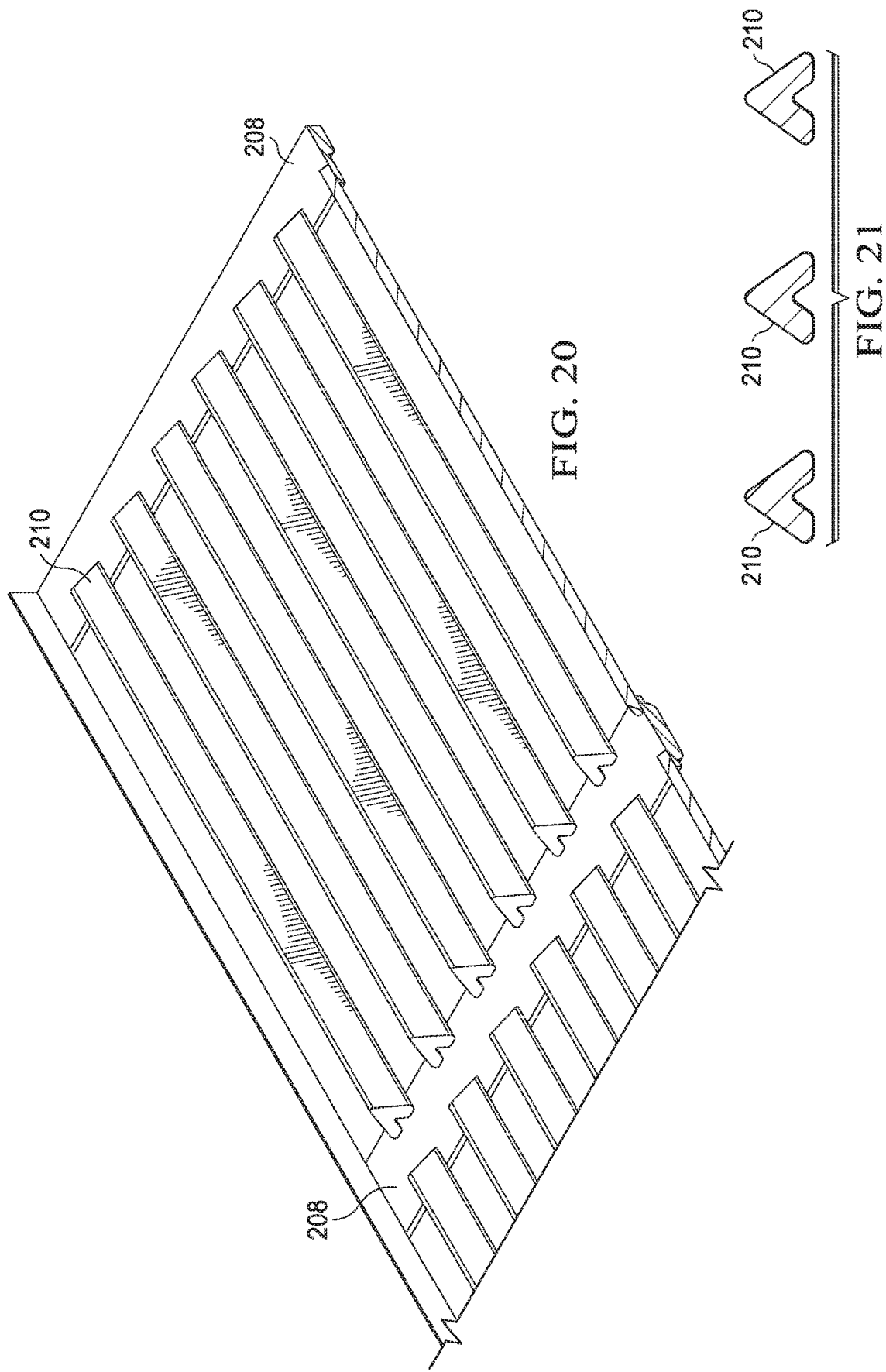

COOKING GRATE WITH ADJUSTABLE HEATING CHARACTERISTICS

CROSS REFERENCE TO RELATED APPLICATIONS

This is a continuation of co-pending U.S. patent application Ser. No. 13/708,626, entitled "COOKING GRATE WITH ADJUSTABLE HEATING CHARACTERISTICS" filed on Dec. 7, 2012 which claims priority to U.S. Provisional Patent Application No. 61/568,963 entitled "COOKING GRATE WITH ADJUSTABLE HEATING CHARACTERISTICS," filed Dec. 9, 2011, the contents of which are hereby incorporated by reference.

BACKGROUND OF THE INVENTION

Cooking with gas and charcoal grills may be done with a combination of convective heat, from hot gases of combustion, and radiant heat, from surfaces heated by such gases in various ways. Cooking with predominately radiant heat (e.g., in excess of 50% or 60% or 70% of the total heat available) at a plane just below or just above the food support element can have benefits with many types of food and cooking styles. However, it is also true that some types of cooking, for example slow cooking with exposure to smoke, may be preferred with less radiant heat than 50%, 60%, or 70%. Previously, products were designed and manufactured without consideration of allowing a user to alter the ratio of convective to radiative heat on the same cooking device.

What is needed is a system and method for addressing the above, and related, issues.

SUMMARY OF THE INVENTION

The invention of the present disclosure, in one aspect thereof, comprises a multi-part cooking grate having a first upper sub-grate having a first plurality of cooking members retained in a fixed relationship relative to one another by at least one upper cross-member, and a second lower sub-grate having a second plurality of cooking members retained in a fixed relationship relative to one another by at least one lower cross member. The first and second sub-grates are configured to fit together such that their respective cooking members interfit to define a first cooking surface that heats with a relatively high degree of radiant heating relative to convective heating. Wherein the first and second sub-grate each define a second cooking surface that heats with a relatively low degree of radiant heating relative to convective heating.

In some embodiments the first sub-grate retains its associated cooking members at a first predetermined spacing from one another and the second sub-grate retains its associated cooking members at a second predetermined spacing from one another. The first and second predetermined spacings may be different so as to provide different degrees of heating with radiant and convective heating.

In further embodiments, the first upper sub-grate has a plurality of upper cross members that form upper end caps for its plurality of cooking members and the second lower sub-grate has a plurality of lower cross members that form lower end caps for its plurality of cooking members. The lower end caps may nest within the upper end caps when the first and second sub-grates are fitted together. The respective cooking members may be retained in a fixed relationship with the respective end caps such that the end caps prevent movement between the cooking members along a length thereof.

In further embodiments, the cooking members of the lower sub-grate are interrupted to receive the cross members of the upper sub-grate when the cross members of the upper sub-grate rest upon the cross members of the lower sub-grate.

The invention of the present disclosure, in another aspect thereof, comprises a multi-part cooking grate with a first upper sub-grate having a first plurality of cooking members retained in a fixed relationship relative to one another by at least one upper cross-member attached to the ends of the first plurality of cooking members, and a second lower sub-grate having a plurality of second cooking members retained in a fixed relationship relative to one another by at least one lower cross member attached to the ends of the second plurality of cooking members. The first and second sub-grates are configured to fit together such that their respective cooking members interfit to define a first cooking surface that heats with a relatively high degree of radiant heating relative to convective heating. The first and second sub-grate each define a second cooking surface that heats with a relatively low degree of radiant heating relative to convective heating.

In some embodiments, the lower cross member of the lower sub-grate nests within the upper cross member of the upper sub-grate when the upper and lower sub-grate are interfitted. The upper cross member of the upper sub-grate may have cooperating recesses to fit the first plurality of cooking members of the lower sub-grate when nested with the lower cross member of the lower sub-grate.

The first and second plurality of cooking members of the first and second sub-grates may be inverted V-shaped cooking members. The first plurality of cooking members of the upper sub-grate may be V-shaped and have ends with a portion removed to be sized to fit into holes defined in the upper cross member. The second plurality of cooking members of the lower sub-grate may be V-shaped and have ends with a portion removed to be sized to fit into holes defined in the lower cross member. A spacing between the cooking members of the upper sub-grate may differ from a spacing between the cooking members of the lower sub-grate so as to create a different degree of convective heating between the upper sub-grate and the lower sub-grate.

The invention of the present disclosure, in another aspect thereof, comprises a multi-part cooking grate with a lower sub-grate with a first plurality of V-shaped cooking members running along a length of the lower sub-grate and having a first predetermined spacing between the first plurality cooking members along a width of the lower sub-grate, and an upper sub-grate with a second plurality of V-shaped cooking members running along a length of the lower sub-grate and having a second predetermined spacing between the second plurality of cooking members along a width of the upper sub-grate. The first predetermined spacing accommodates a width of each of the second plurality of cooking members and the second predetermined spacing accommodates a width of each of the first plurality of cooking members such that the upper and lower sub-grates may be nested to create a first cooking surface comprising the first and second plurality of cooking members in an interfitted alternating relationship producing a relatively high degree of radiant heat compared to convective heat. Each of the upper and lower sub-grate individually provide a second cooking surface with a relatively high degree of convective heat compared to radiant heat.

In some embodiments, the first and second predetermined spacing are different such that, individually, the upper and lower sub-grates will provide different degrees of convective heat relative to radiant heat. The upper and lower sub-grates may each have at least one upper and lower cross member, respectively, that retains the respective cooking members in the first and second predetermined spacing.

In further embodiments, the upper and lower cross members nest to prevent movement between the upper and lower sub-grates along their lengths. The upper and lower sub-grates may each have a plurality of upper and lower cross members, respectively, with the first plurality of lower cooking members interrupted to accommodate at least one of the plurality of upper cross members when the upper sub-grate is placed upon the lower sub-grate.

BRIEF DESCRIPTION OF THE DRAWINGS

FIG. 20 is a perspective cutaway view of a portion of the lower cooking grate of FIG. 19.

FIG. 21 is a close-up end cutaway view of a portion of the lower cooking grate of FIG. 19.

DETAILED DESCRIPTION OF THE PREFERRED EMBODIMENTS

Figure 1:
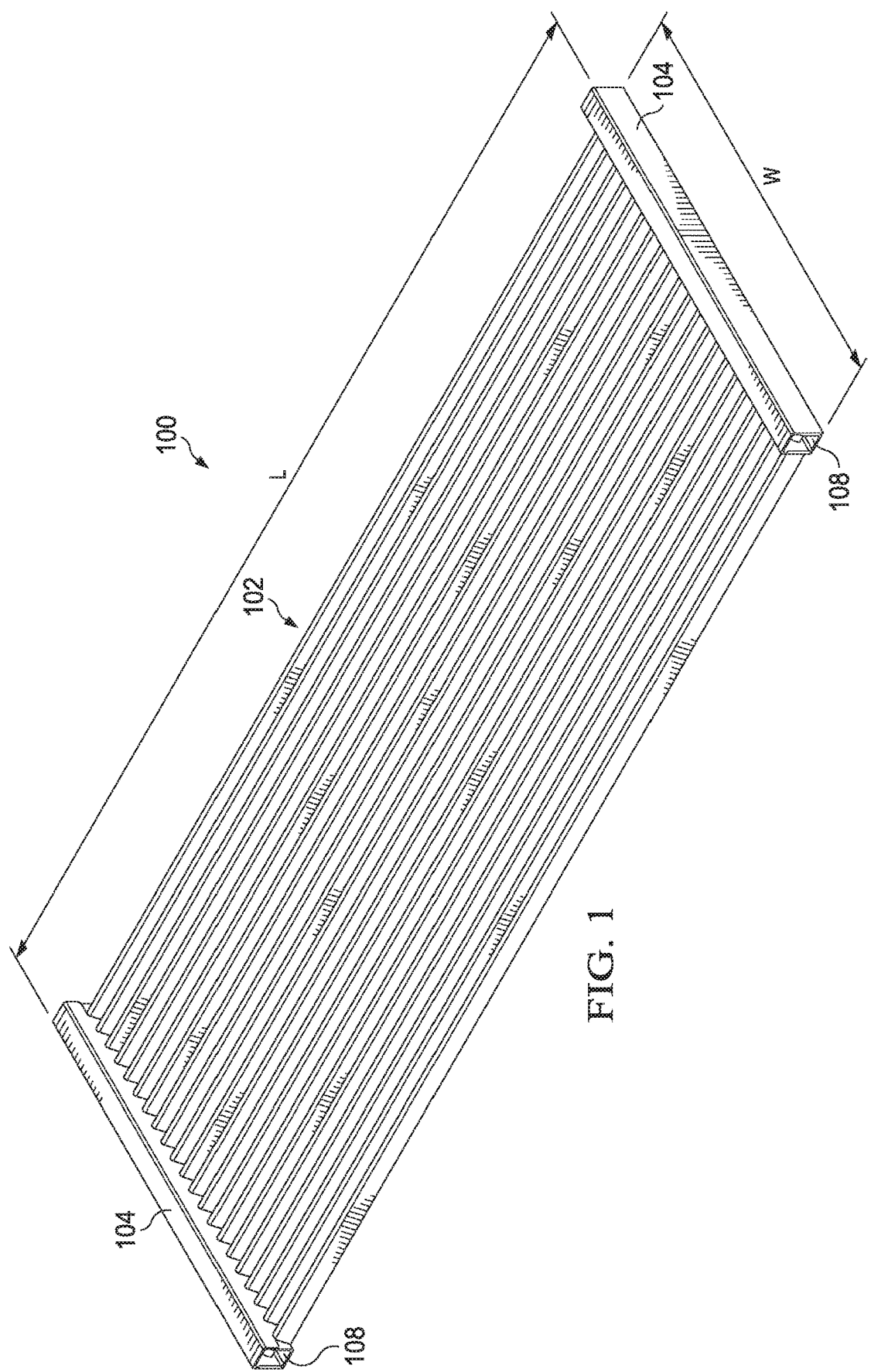
FIG. 1 is a perspective view of a formed multi-part cooking grate according to aspects of the present disclosure.
Figure 2:
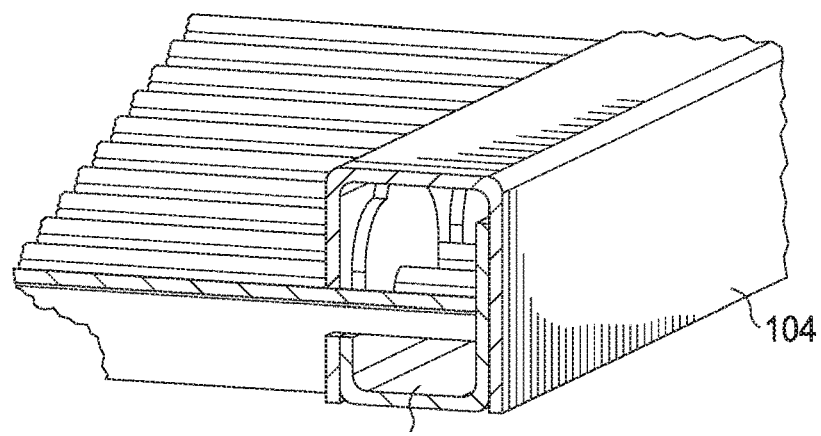
FIG. 2 is a perspective side cutaway view of a portion of the cooking grate of FIG. 1.
Figure 3:
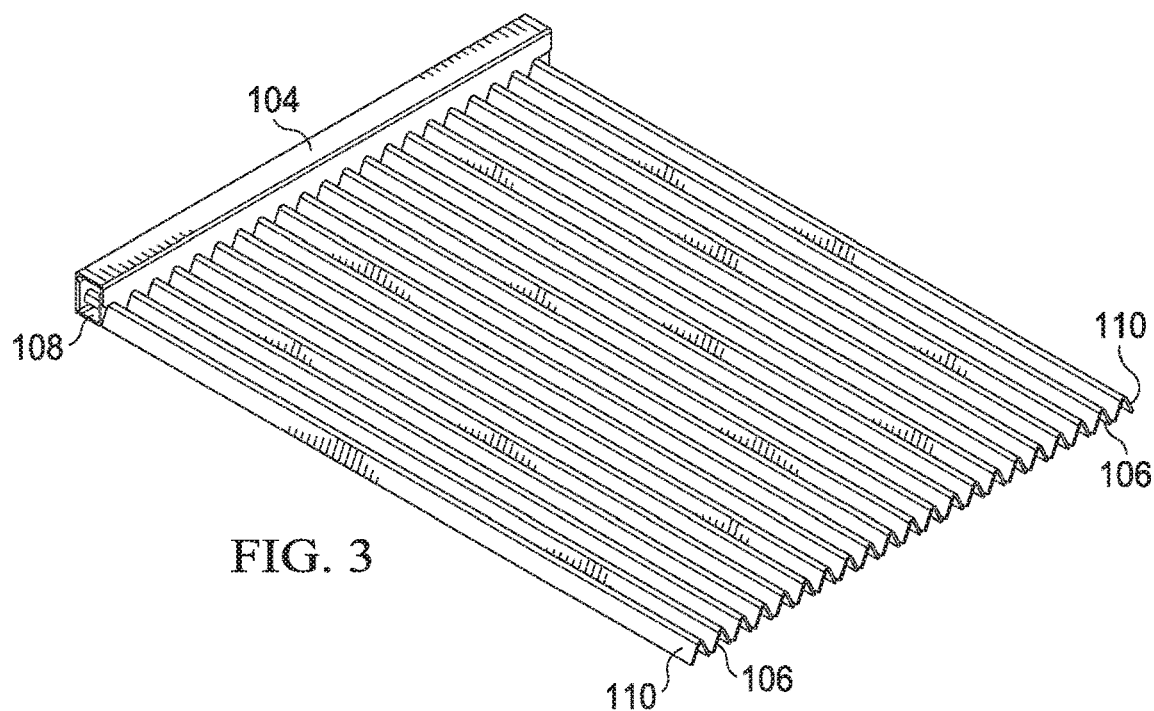
FIG. 3 is a perspective end cutaway view of the cooking grate of FIG. 1.

Referring now to FIGS. 1-12, one embodiment of a multi-part cooking grate in accordance with the present disclosure will be described. FIG. 1 is a perspective view of a formed multi-part cooking grate according to aspects of the present disclosure. In the present embodiment, an arrangement of food support elements in a general form of inverted V-shapes are utilized (though other cross sectional shapes can also be used) to form a cooking surface 102. FIG. 2 is a perspective side cutaway view of a portion of the cooking 100 grate of FIG. 1. FIG. 2 illustrates the interlocking and constructing of cross members 104, 108 discussed further below. FIG. 3 is a perspective end cutaway view of the cooking grate of FIG. 1 illustrating the inverted V-shape of the grill surface 102.

Figure 4:
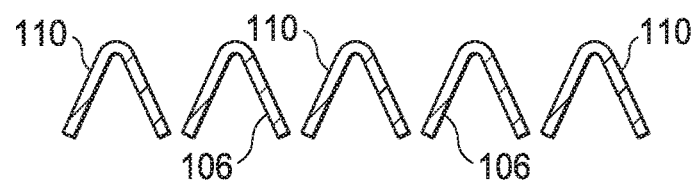
FIG. 4 is a close-up end cutaway view of a portion of the cooking grate of FIG. 1.
Figure 5:
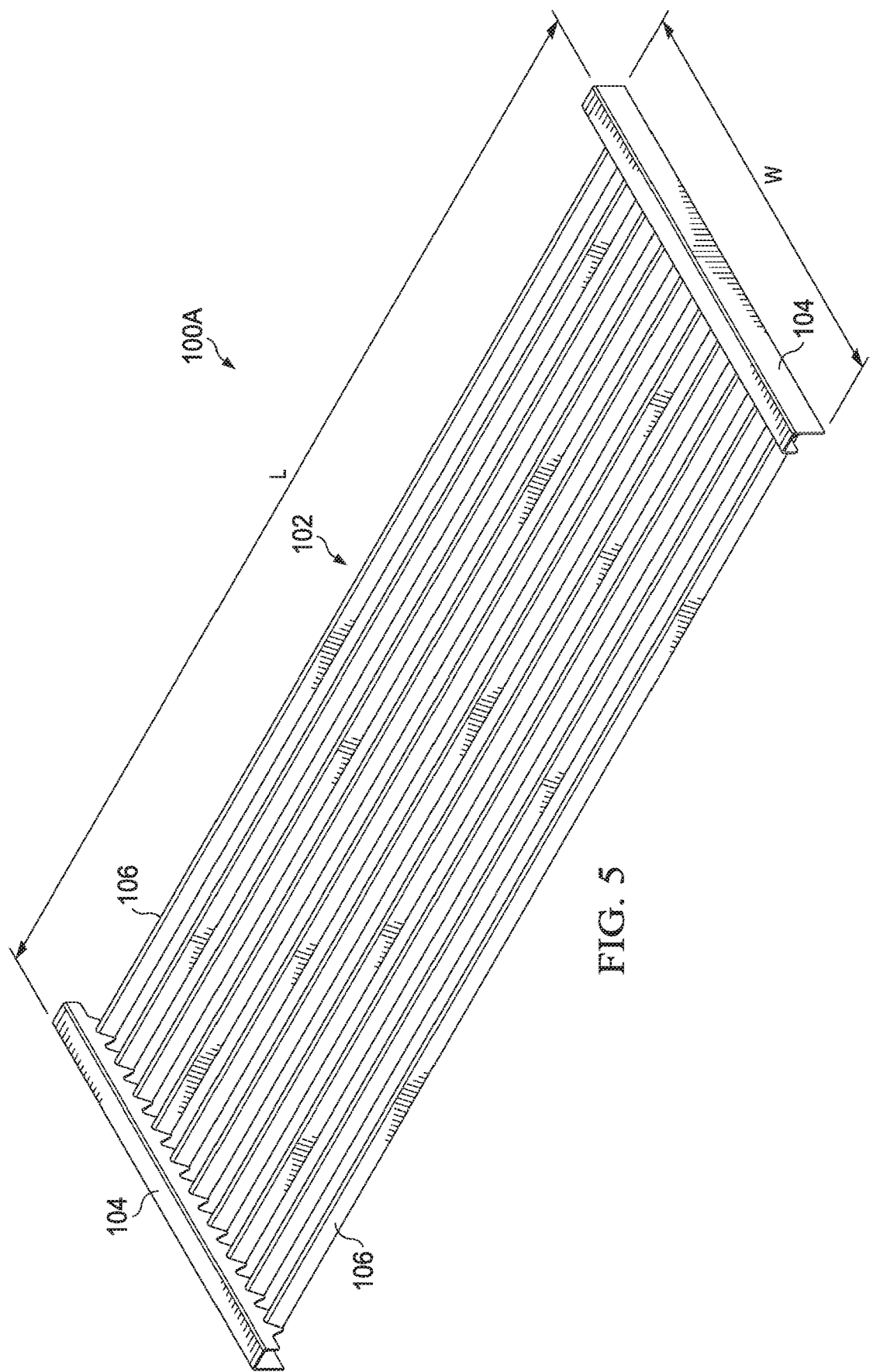
FIG. 5 is a perspective view of an upper portion of the cooking grate of FIG. 1.
Figure 6:
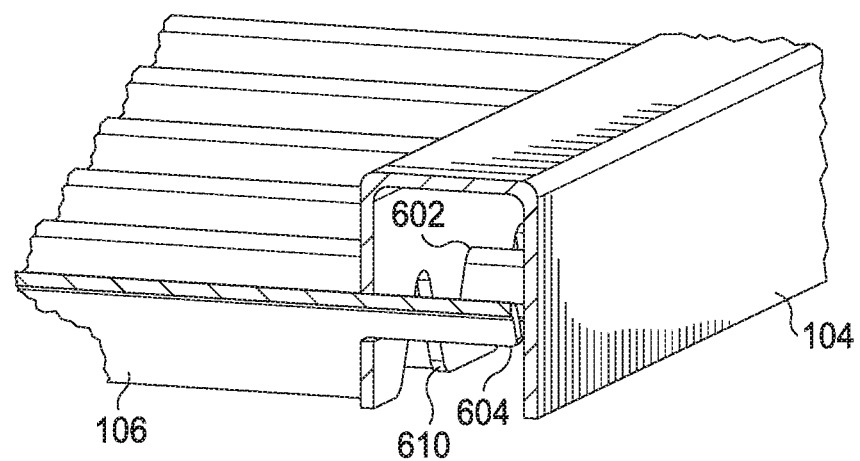
FIG. 6 is a perspective side cutaway view of a portion of the upper cooking grate of FIG. 5.
Figure 7:
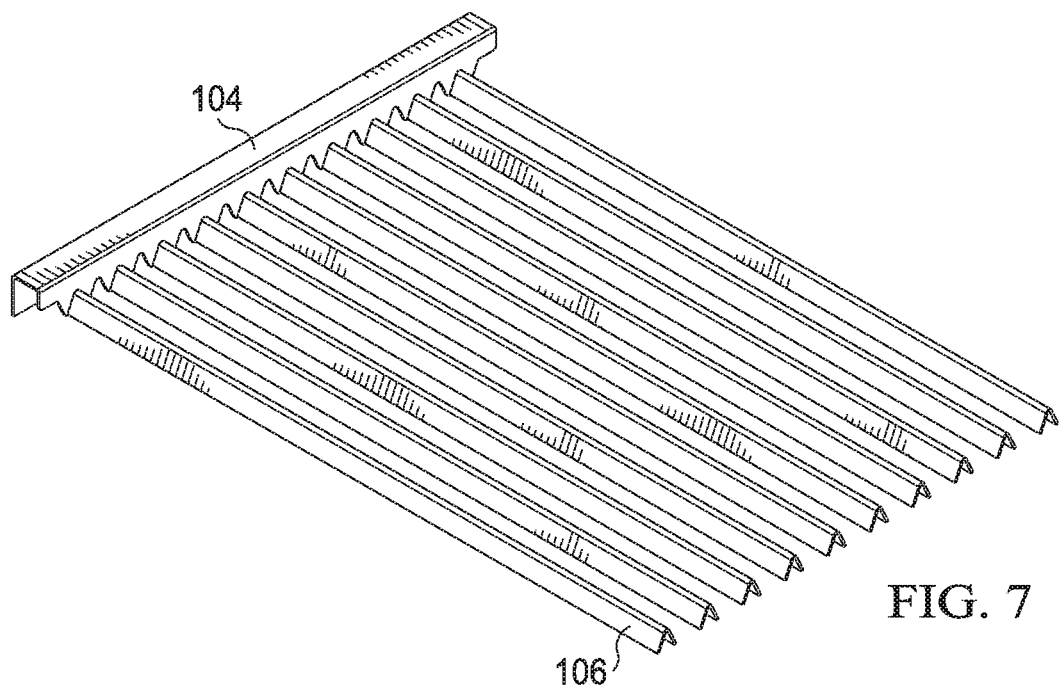
FIG. 7 is a perspective end cutaway view of the upper grate of FIG. 5.
Figure 8:
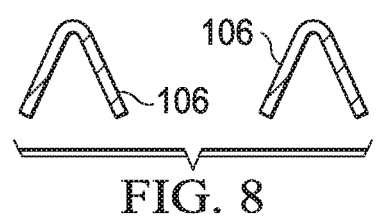
FIG. 8 is a close-up end cutaway view of a portion of the grate of FIG. 5.

FIG. 4 is a close-up end cutaway view of a portion of the cooking grate 100 of FIG. 1 illustrating that the surface 102 comprises two set sets 106, 110 of V-shaped cooking members. Referring now to FIG. 5, a perspective view of an upper portion 100A of the cooking grate of FIG. 1 is shown. The upper portion 100A includes cross members 104 retaining cooking members 106 in a fixed and inverted relationship with respect to one another and forms a portion of the cooking surface 102. FIG. 6 is a perspective side cutaway view of a portion of the upper cooking grate 100A of FIG. 5. FIG. 7 is a perspective end cutaway view of the upper grate 100A of FIG. 5. Finally, FIG. 8 is a close-up end cutaway view of a portion of the grate 100A of FIG. 5.

Figure 9:
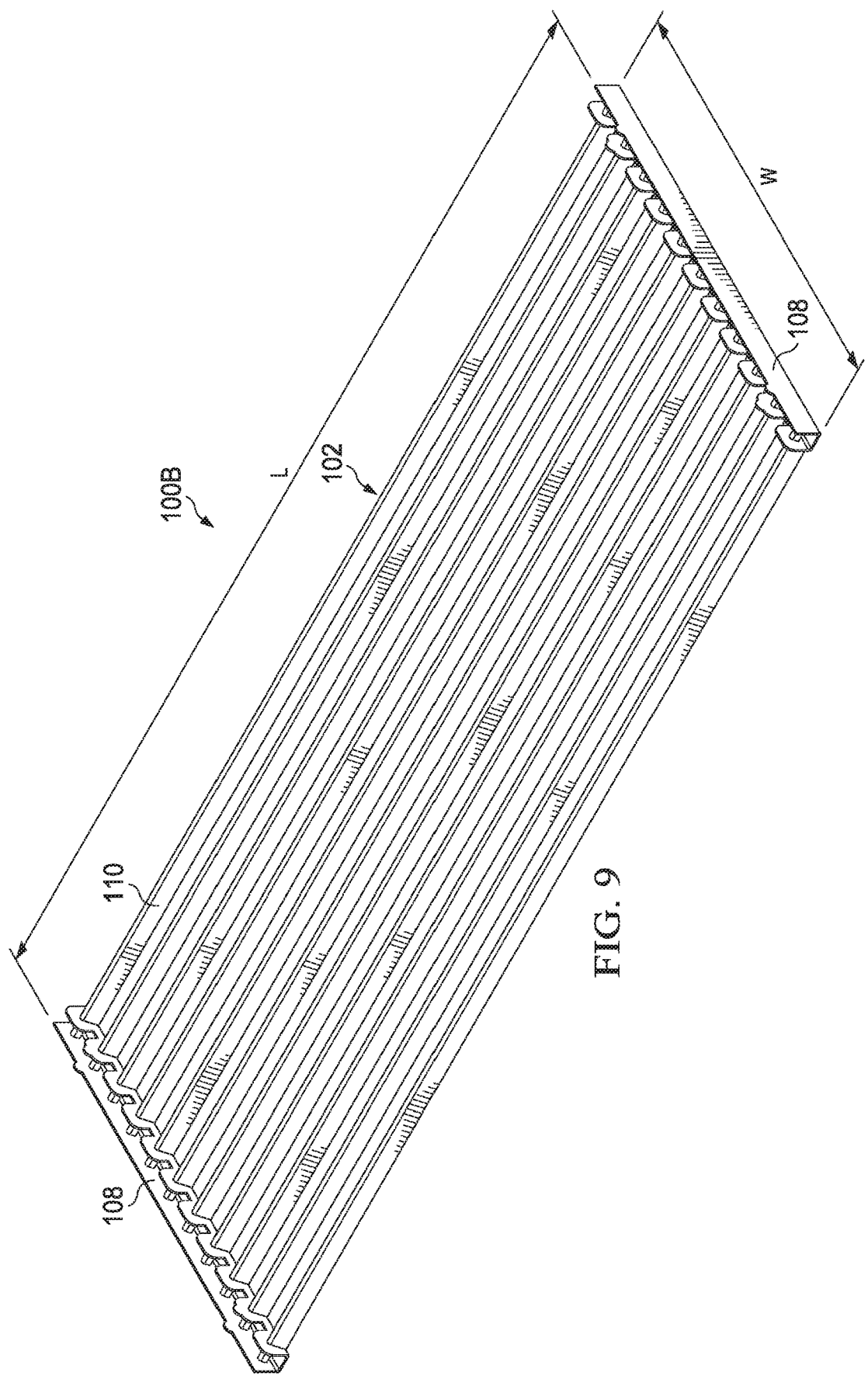
FIG. 9 is a perspective view of a lower cooking grate of FIG. 1.
Figure 10:
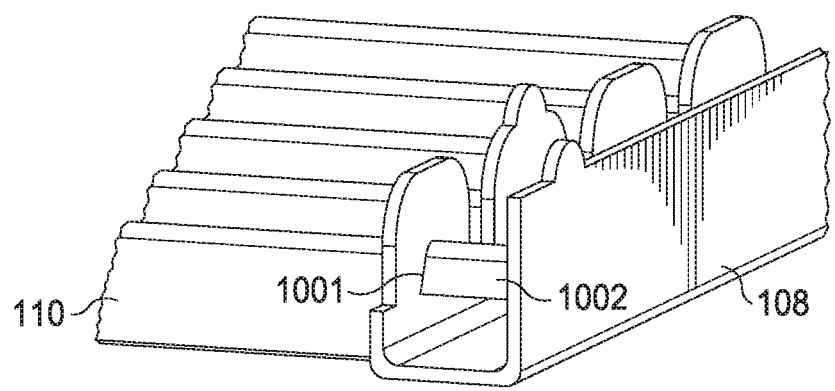
FIG. 10 is a perspective side cutaway view of a portion of the lower cooking grate of FIG. 9.
Figure 11:
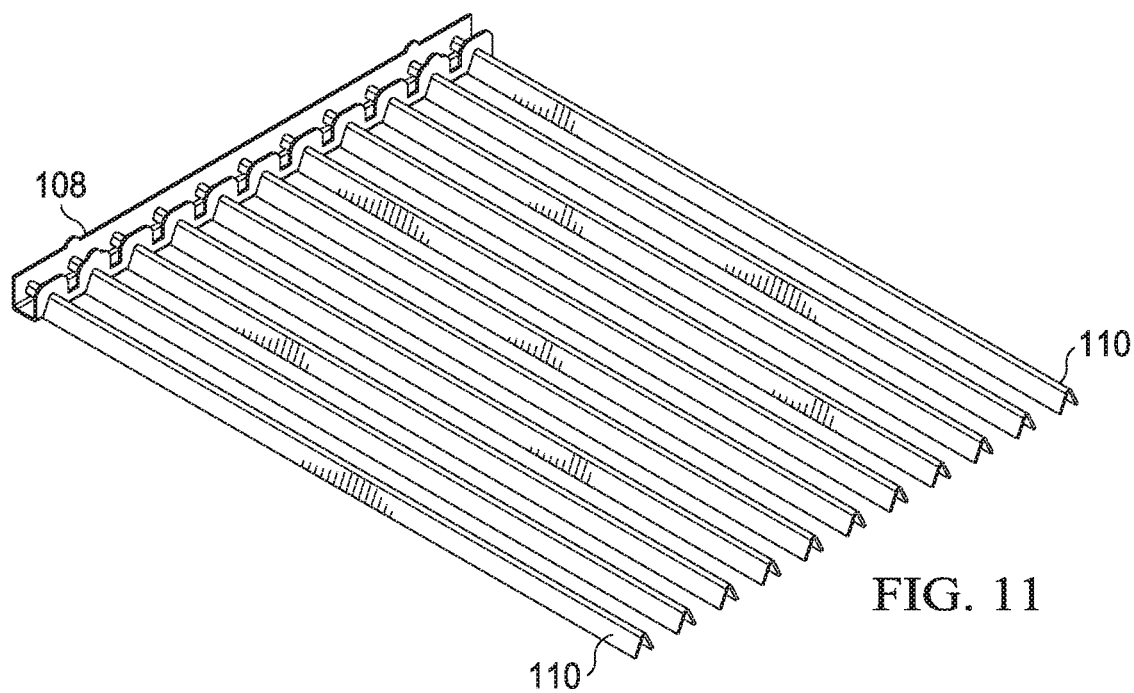
FIG. 11 is a perspective end cutaway view of the lower cooking grate of FIG. 9.
Figure 12:
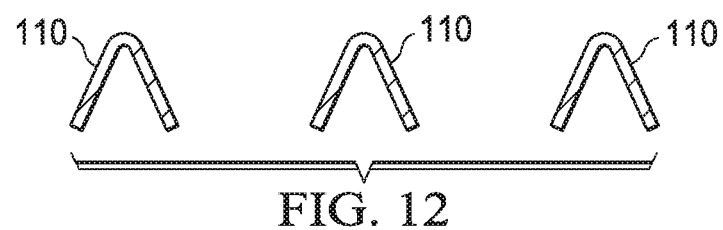
FIG. 12 is a close-up end cutaway view of a portion of the lower cooking grate of FIG. 9.

Referring now to FIG. 9, a perspective view of a lower cooking grate 100B of FIG. 1 is shown. The lower grate 100B cooperates with the upper grate 100A to form the complete integrated grate 100 with the full cooking surface 102. However, each of the sub-grates 100A and 100B can be utilized separately to alter cooking characteristics of the surface 102. FIG. 10 is a perspective side cutaway view of a portion of the lower cooking grate 100B of FIG. 9. FIG. 11 is a perspective end cutaway view of the lower cooking grate 100B of FIG. 9. FIG. 12 is a close-up end cutaway view of a portion of the lower cooking grate 100B of FIG. 9.

With reference to the aforedescribed figures, it will be appreciated that the multi-part cooking grate 100, comprises the upper sub-grate 100A (FIG. 5) and the lower sub-grate 100B (FIG. 9). From the perspective view of FIG. 1, it can be seen that the cooking surface 102 substantially comprises various pluralities of V-shaped cooking members. The V-shaped cooking members are divided into a first set 106 and a second set 110. The V-shaped cooking members of the first set 106 are affixed in relation to one another by upper member cross members 104. Together the V-shaped cooking members 106 and the cross members 104 comprise sub-grate 100A. The V-shaped cooking members of the second set 110 are affixed in relation to one another by lower member cross members 108. Together the V-shaped cooking members 110 and the lower member cross members 108 comprise lower sub-grate 100B.

FIG. 2 illustrates how the upper member cross member 104 and the second cross member 108 have a cooperatively fitting relationship such that when fitted together, the first set of V-shaped members 106 interfits with the second set of V-shaped members 110. With additional reference to the cutaway views of FIGS. 3 and 4, it can be seen that relatively little space remains between the V-shaped members 106 and 110 in such a configuration.

Returning again to FIG. 5, the cooking grate 100 has been disassembled into its constituent components. FIG. 5 illustrates an upper portion of the grate 100A. From this view it can be appreciated how the cross members 104 retain the V-shaped cooking members 106 in a fixed relationship relative to one another. With reference to FIGS. 7 and 8 and it can also be seen how a relatively large amount of space is provided between the adjacent V-shaped members 106.

Referring again also to FIG. 9, a lower portion of the cooking grate 100B is shown. Here it can be seen that the cross members 108 retain the second set of V-shaped cooking members 110 in a fixed relationship relative to one another. With reference to FIGS. 11 and 12, it can be seen how a relatively large amount of space is once again provided between the adjacent V-shaped cooking members 110.

Inset FIGS. 6 and 10, provide additional illustration on the relationship between the cross member 104 and V-shaped members 106, and the cross members 108 and V-shaped members 110, respectively. In one embodiment, the cross members 104 are channelized members with cutouts 602 for receiving a portion 604 of each of the V-shaped members 106 and retaining them in a fixed relationship. As can be seen from FIG. 6, the portion 604 within the cutout 602 may only be a portion of the entire end of the V-shaped members 106. The cross members 104 may also provide a series of V-shaped cooperating recesses 610 on at least one side for interfitting with the cooking members 110 from sub grating 100B.

The cooking members 106 may be made from a heat resistant material such as steel, stainless steel, porcelain coated steel, ceramic, ceramic coated metal, or some other suitable material. The cross members 104 may also comprise a heat resistant material. The cross members may be welded to the cooking members 106, have a friction or interference fit, or be affixed in another heat resistant manner.

Returning to FIG. 10, it can be seen that the cross members 108 may also be channelized with one side having cutouts 1001 for receiving a portion 1002 of the respective lower cooking members 110 to form the lower sub grating 100B. The portions 1002 may be retained in the cutouts 1001 by a friction fit, or may be welded or provided with another heat resistant fastener. As shown in FIG. 10, the portions 1001 of the members 110 fitting the cutouts may be cut from the full V-shaped cooking members 110 rather than comprising the full height and width of the members 110 at the ends.

FIG. 2, which illustrates the combined cooking grate 100, shows how the cross members 104 and 108 nest to prevent end-to-end movement (along length L) of the assembled sub grating 100A with 100B. Here the lower cross member 108 nests within the upper cross member 104, but the converse could also be implemented. Side-to-side movement (along width W) will be inhibited by the interlocking of the upper cooking members 106 beside the lower cooking members 110. As described, the lower cooking members 110 also cooperate and interfit with the recesses 610 on the upper cross members 104 of the upper sub-grate 100A.

In the illustrated embodiments, the cross members 104, 108 also serve as end caps such that the respective cooking members 106, 108 are held in a fixed relationship from the ends, thus allow the cooking surface 102 to be more or less continuous. However, in other embodiments, cross members may be placed medially rather than, or in addition to, being placed on the ends. In such cases, the cross members 104, 108 may have cutouts on both sides for passing at least a portion of the cooking members completely through.

It can be seen that the cooking grate 100 may be assembled as shown in FIG. 1 such that the combined V-shaped cooking members 106 and 110 provide for relatively little hot gas flow to the cooking surface 102. Consequently, when configured as shown in FIG. 1, the cooking grate 102 will provide a relatively larger amount of radiative heating. However, when either one of the upper or lower sub-grates 100A, 100B is used alone, it can be seen that a relatively large amount of hot gas will be allowed through the cooking surface 102. Consequently, in the configuration of FIG. 5 or 9, a relatively high amount of cooking by convection will occur compared to that of FIG. 1.

Figure 24:
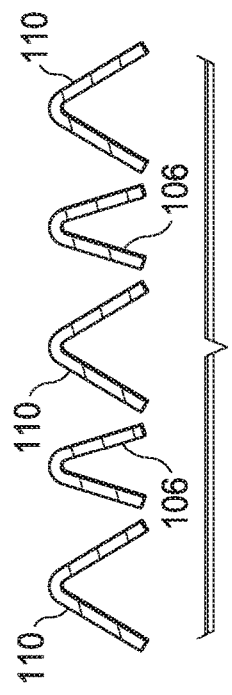
FIG. 24 is an end-on cutaway view of a cooking grate with variable spacing between sub-grates according to the present disclosure.

It is contemplated that the cooking surface 102 may be easily and quickly reconfigured from that of FIG. 1 to that of FIG. 5 or 9 by user without tools. In one embodiment, the space between adjacent V-shaped cooking members of the first set 106 may differ from the spacing between adjacent V-shaped members of the second set 108. This may be accomplished, for example, by varying the widths of the members of the first set 106 relative to the width of members of the second set 110, as shown in FIG. 24. In this way, the cooking grate 100A may provide different cooking characteristics than cooking grate 100B and each will be different than the combination 100 of FIG. 1. Thus, multiple cooking configurations with differing combinations of radiant and convective heating can be achieved with the same grate device. It is also understood that the cooking members may not be V-shaped in all embodiments. To greater or lesser degrees, other cooking member shapes, such as round or rectilinear in cross-section, could function with the devices of the present disclosure.

The general dimensions of the cooking surface 102 and the constituent components of the grate 100 can be varied according to the needs of the user such that existing gas, charcoal, electric, and other grills can be retrofitted to utilize the devices of the present disclosure. In one embodiment the materials used for the construction of the cooking grate 100 will be cast iron.

As described, whether the grate 100 is utilized in the combined form including sub-grate 100A combined with sub-grate 100B, or whether one of sub-grates 100A, 100B are used individually, influences cooking characteristics. A primary variation will be in the degree of heating that occurs on the surface 102 as a result of radiative (e.g., infrared) heating versus convective heating.

A grate was constructed according to that shown and described herein in FIGS. 1-12. Assembled as shown in FIG. 1, the grate was placed into the firebox of a gas grill with a 29,853 BTU/hour heat rate. The total cooking surface was 446.25 square inches. The heat input to the grate was 30.37205 kW/square meter. The heat flux, percentage of IR, thermal efficiency, and radiative efficiency was measured at the front, center, and back of the grill. The procedure used for measuring and calculating these values is described in a presentation summary entitled "Two New Methods for Measuring Performance of Underfired Broilers" by Alexander T.

Figure 22A:
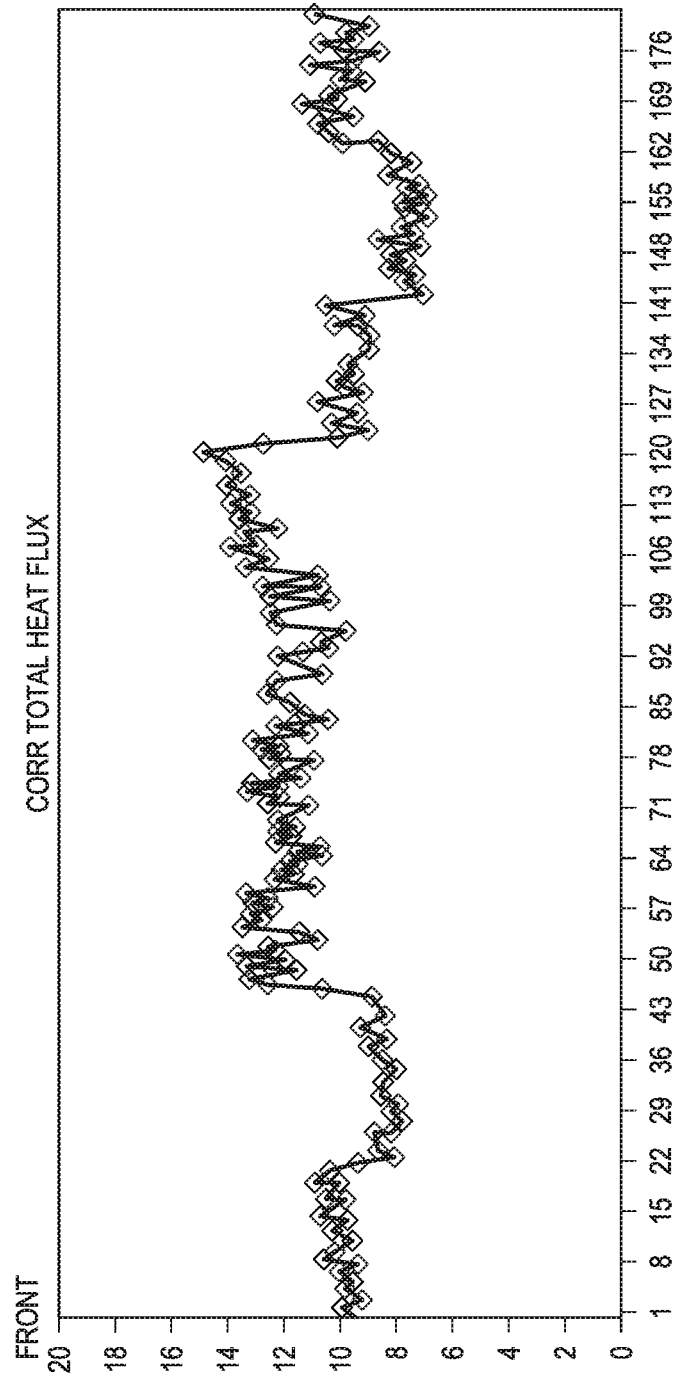
FIG. 22A is a plot of corrected total heat flux for a cooking grate according to the present disclosure on a front location.
Figure 22B:
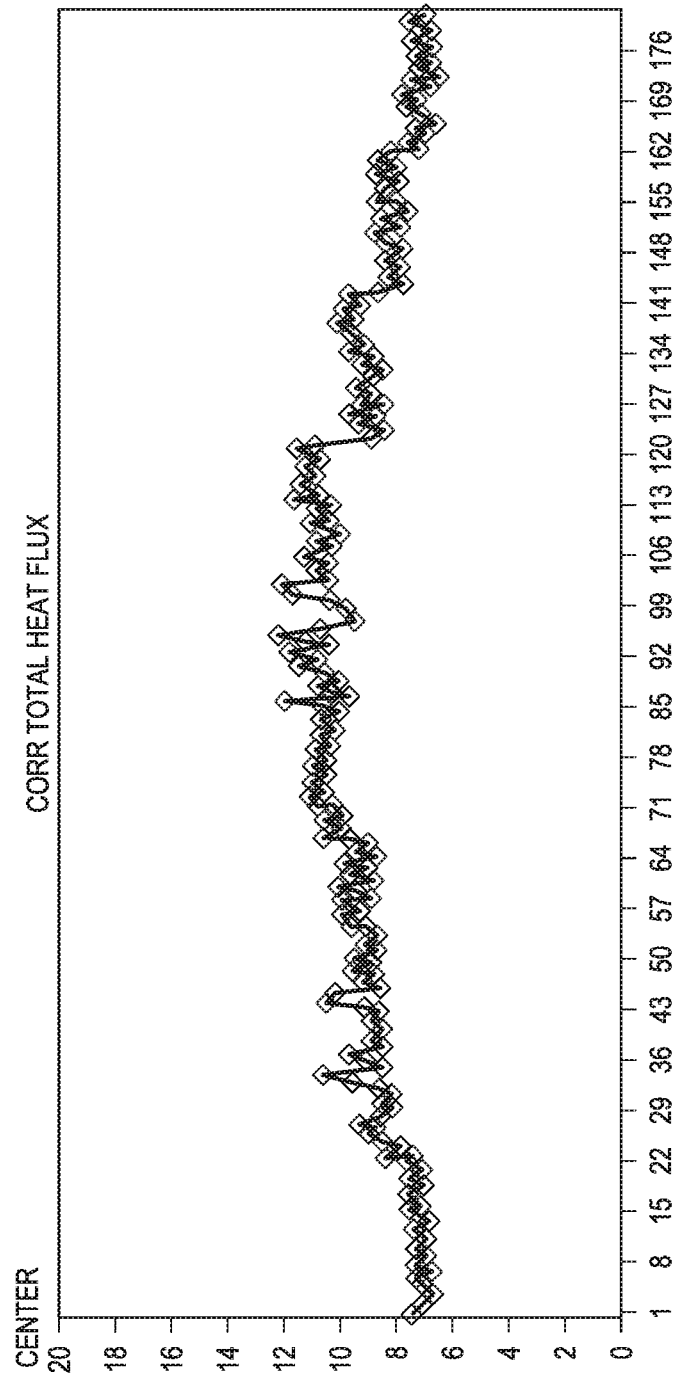
FIG. 22B is a plot of corrected total heat flux for the same cooking grate on a center location.
Figure 22C:
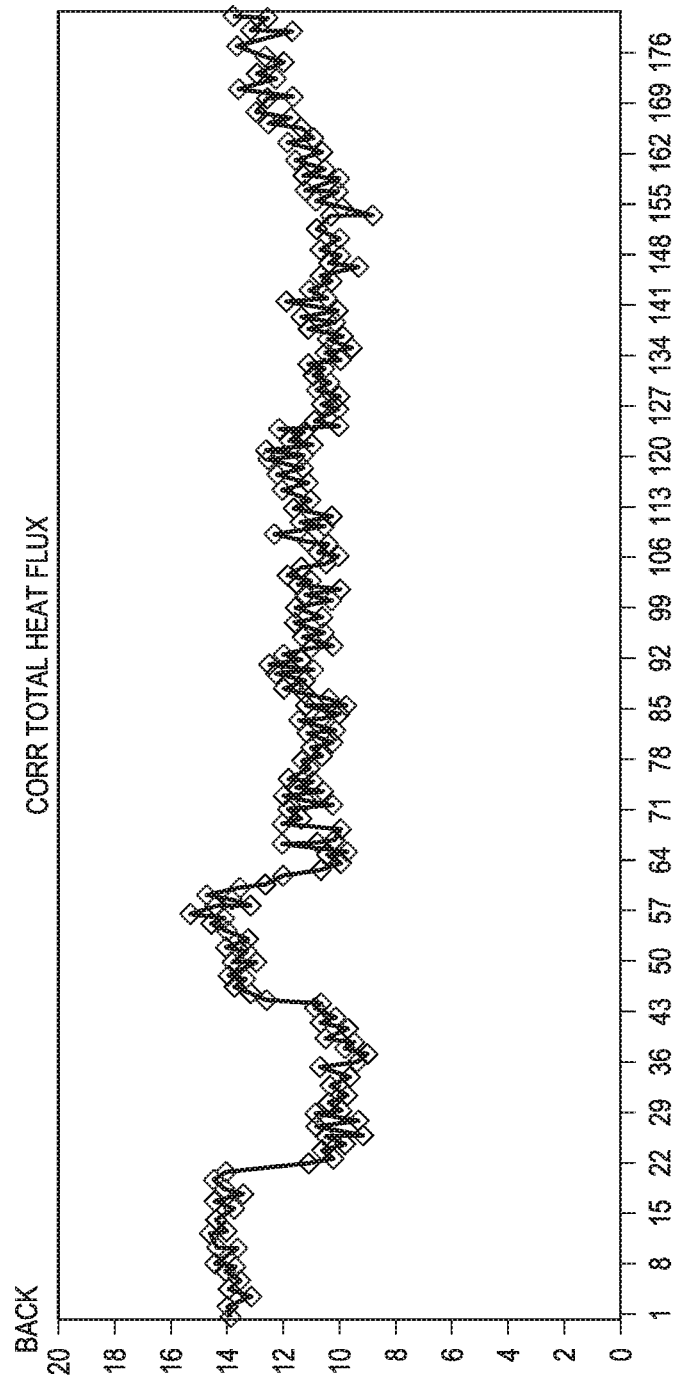
FIG. 22C is a plot of corrected total heat flux for the same cooking grate on a back location.

Gafford and presented to the American Society of Gas Engineers on Jun. 5, 2012 (currently available at www.asgenational.org/Content/Files/Presentations/2012/TwoNewMethodsMeasuringPerformance_AlexGifford.pdf), hereby incorporated by reference. The results of the test are summarized in Table 1 below. The corrected total heat flux at the front, center, and back are shown in the plots contained in FIGS. 22A, B, and C, respectively.

TABLE 1

|  | heat flux | % IR | therm ef | rad ef |
|---|---|---|---|---|
| front | 10.45803 | 78.06689 | 34.43% | 26.78% |
| center | 9.215902 | 80.91794 | 30.34% | 24.58% |
| back | 11.77218 | 79.13757 | 38.76% | 30.75% |
| avg. | 10.48204 | 79.37413 | 0.345121 | 0.273682 |

Figure 23A:
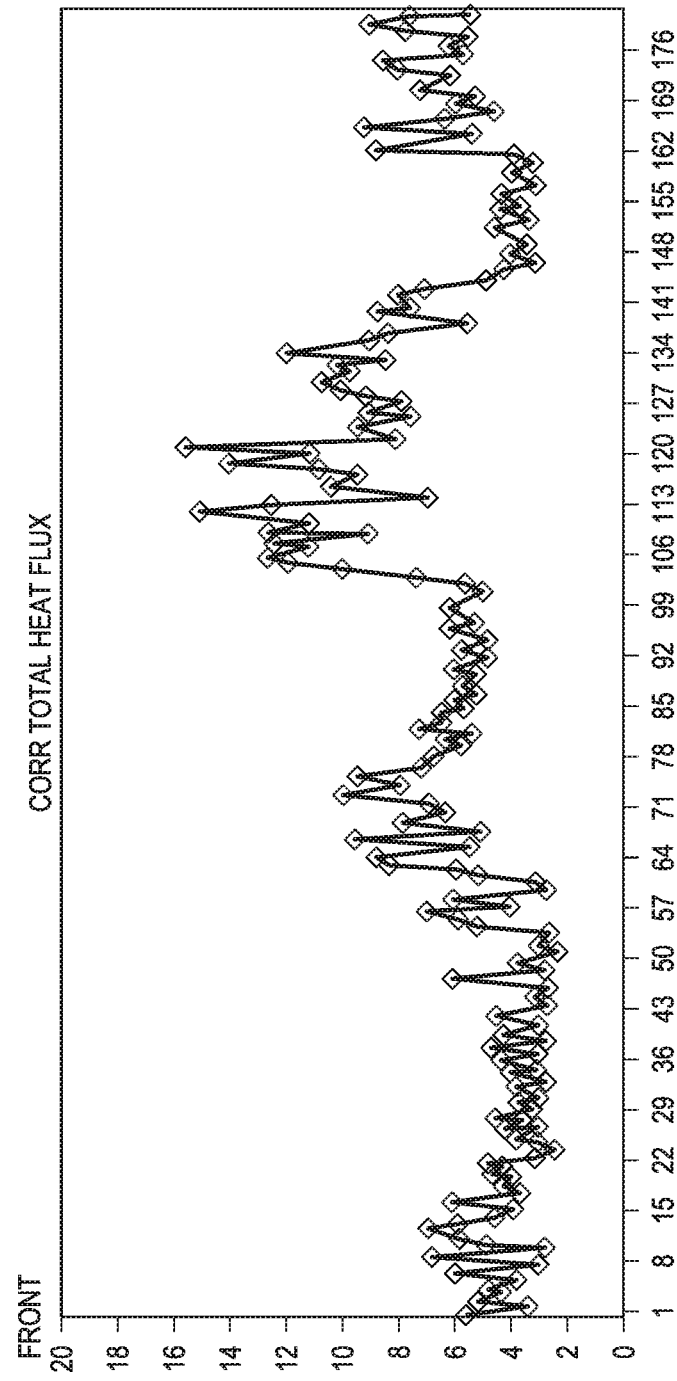
FIG. 23A is a plot of corrected total heat flux for another cooking grate according to the present disclosure on a front location.
Figure 23B:
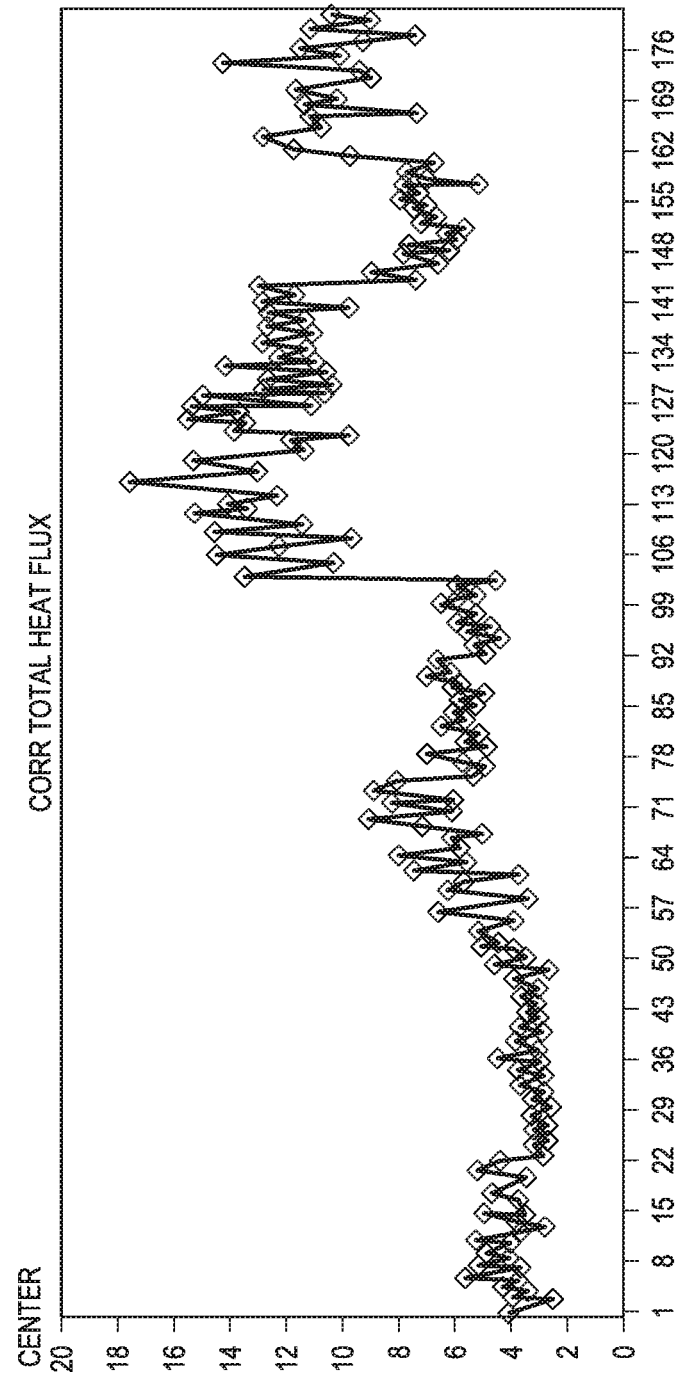
FIG. 23B is a plot of corrected total heat flux for the same cooking grate on a center location.
Figure 23C:
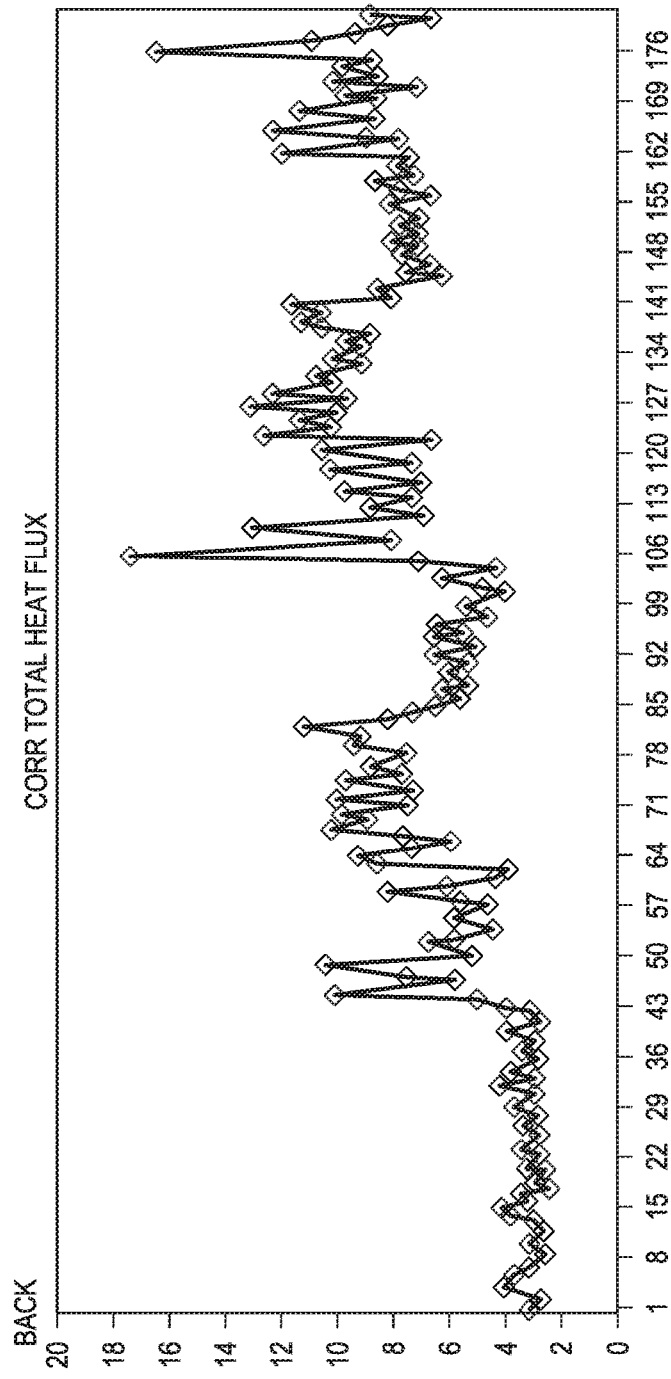
FIG. 23C is a plot of corrected total heat flux for the same cooking grate on a back location.

The portion of the tested grate corresponding to the bottom sub-grate 100B was also tested alone. As shown in FIGS. 9-13, this configuration has a cooking surface 102 that is approximately half or slightly more open to the heat source in the firebox. The test procedure and conditions were the same as the initial test with the results summarized in Table 2 below. The corrected heat flux at the front, center, and back of the grating are shown in the plots contained in FIGS. 23 A, B, and C, respectively.

TABLE 2

|  | heat flux | % IR | therm ef | rad ef |
|---|---|---|---|---|
| front | 6.269843 | 42.46003 | 20.64% | 8.61% |
| center | 7.524133 | 48.3062 | 24.77% | 11.46% |
| back | 7.035842 | 47.61502 | 23.17% | 10.10% |
| avg. | 6.943273 | 46.12708 | 0.228607 | 0.100549 |

The results from these two tests indicate that with only the sub-grate (e.g., 100B) the radiant heat was 46.13% and the convective heat was 53.87%. With the fully assembled configuration (e.g., 100) radiant heat was 79.37% and the convective heat was 20.63%. Since the grating 100 is not air tight, it would be expected that even in the configuration of FIG. 1, some convective heating would occur. However, the normally expected variation across cooking grates is +/−2%. The system of the present disclosure has demonstrated the ability to decrease (or increase) convective heating by a factor in excess of 2.5.

Figure 13:
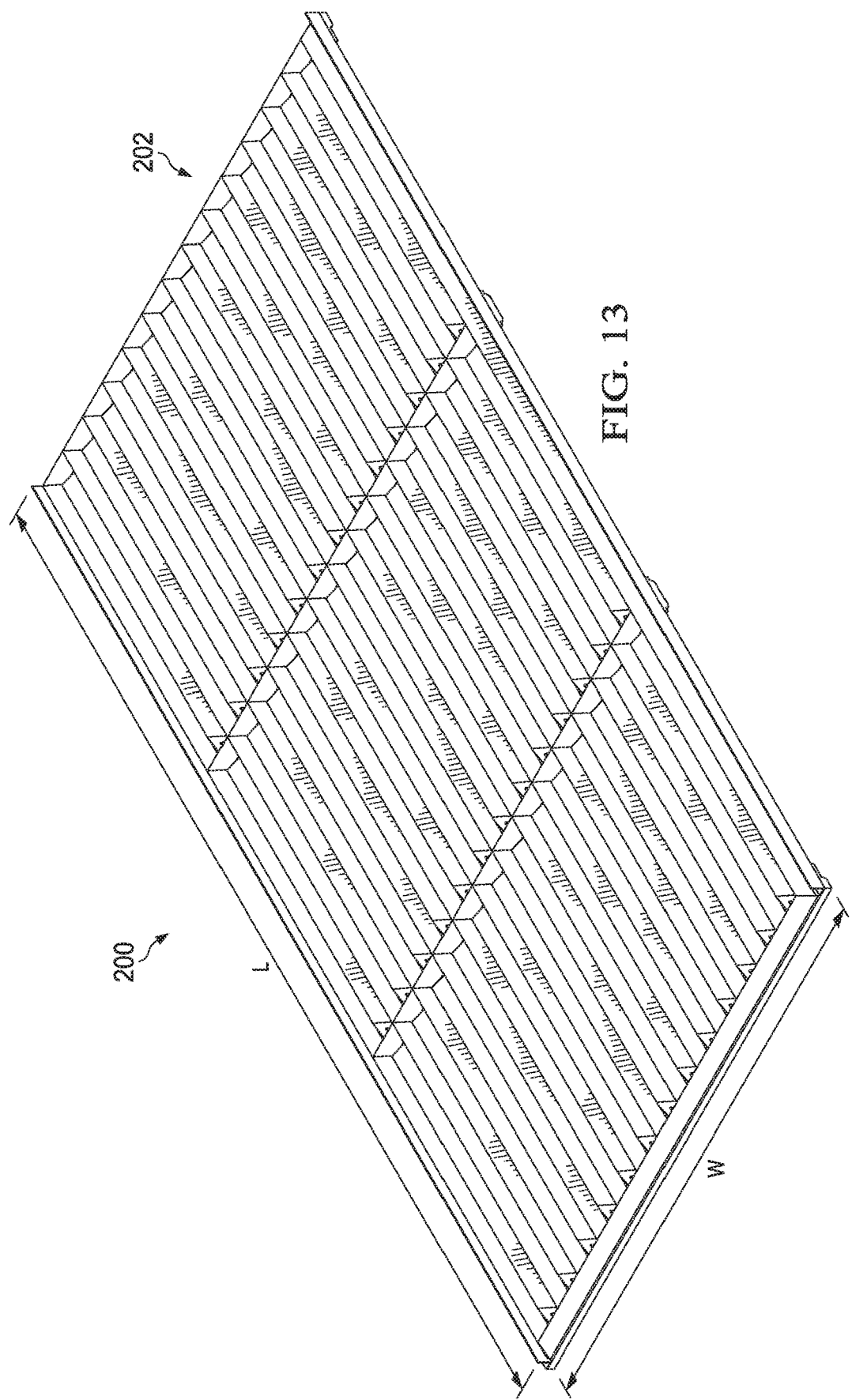
FIG. 13 is a perspective view of another embodiment of a cast or forged multi-part cooking grate according to aspects of the present disclosure.
Figure 14:
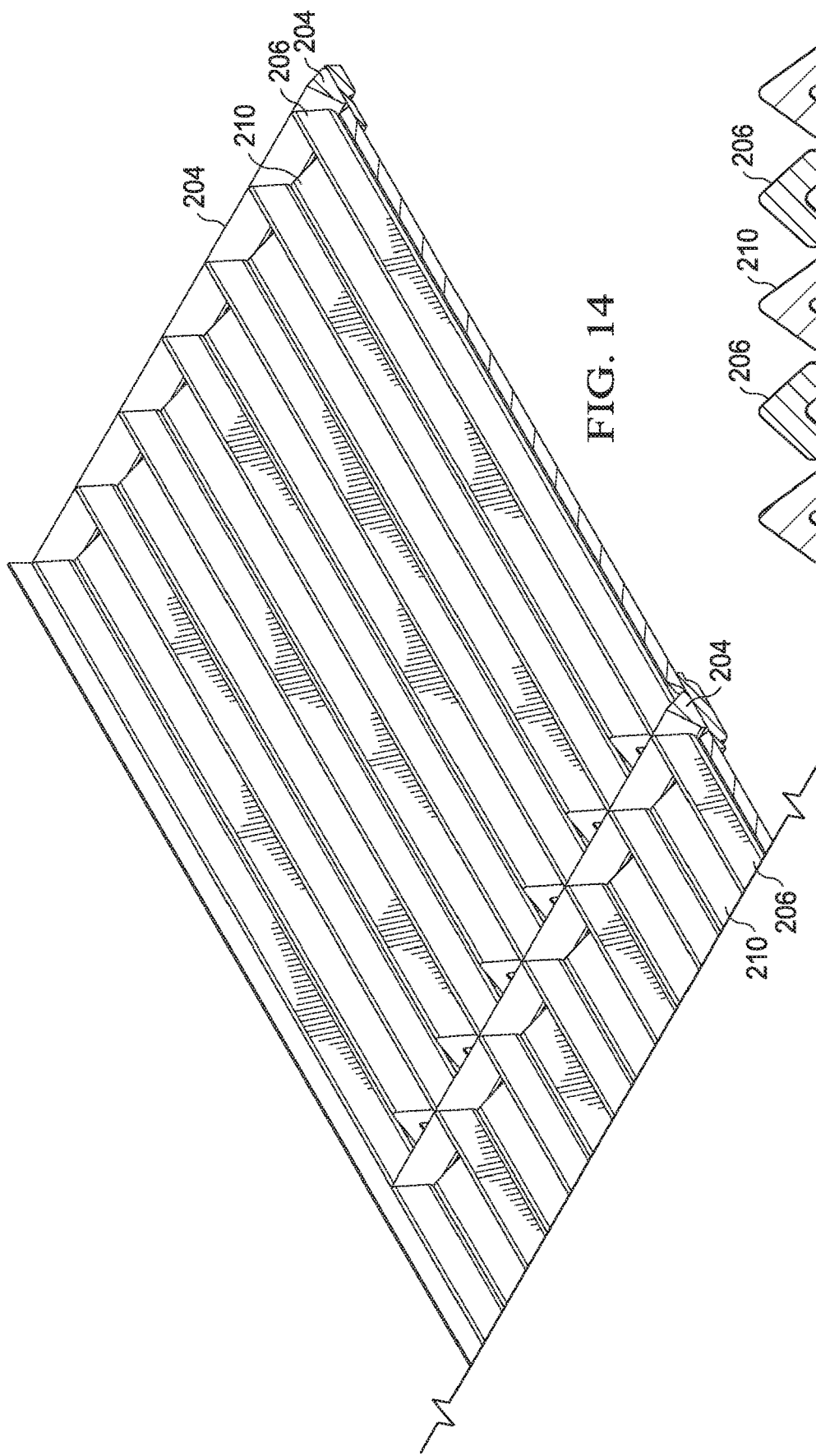
FIG. 14 is a perspective cutaway view of a portion of the cooking grate of FIG. 13.
Figure 15:
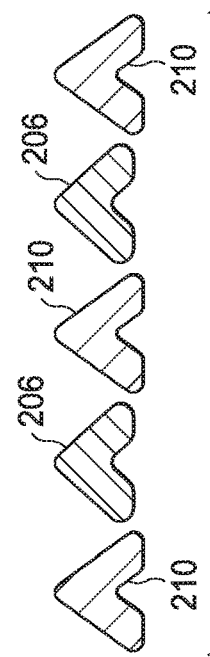
FIG. 15 is a close-up end cutaway view of a portion of the cooking grate of FIG. 13.

Referring now to FIGS. 13-21 another embodiment of a multi-component cooking grate 200 is shown. FIG. 13 is a perspective view of the grate 200 fully assembled in a radiative cooking mode. FIG. 14 is a perspective cutaway view of a portion of the cooking grate 200 of FIG. 13, and FIG. 15 is a close-up end cutaway view of a portion of the cooking grate 200 of FIG. 13.

Figure 16:
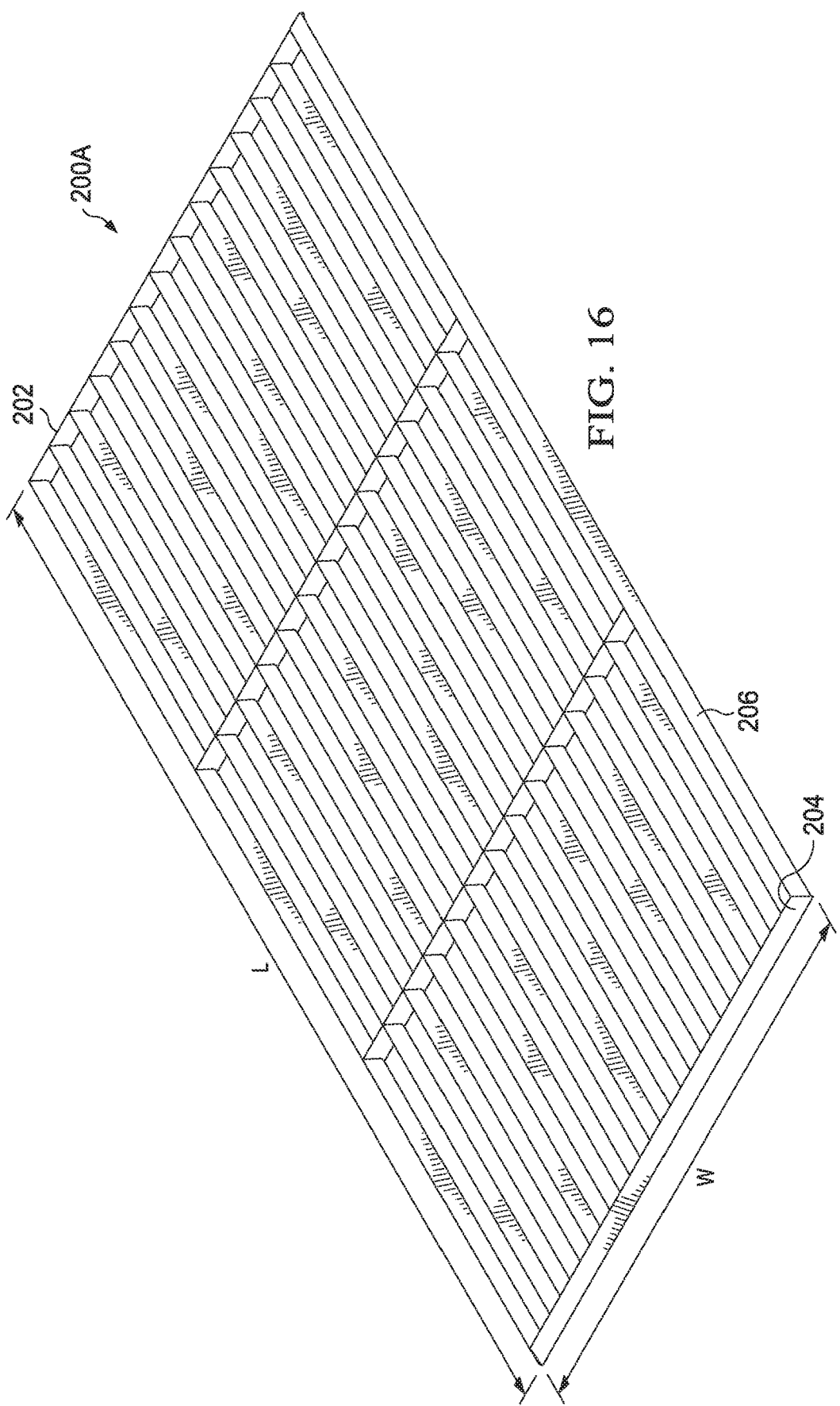
FIG. 16 is a perspective view of an upper portion of the multi-part cooking grate of FIG. 13.
Figure 17:
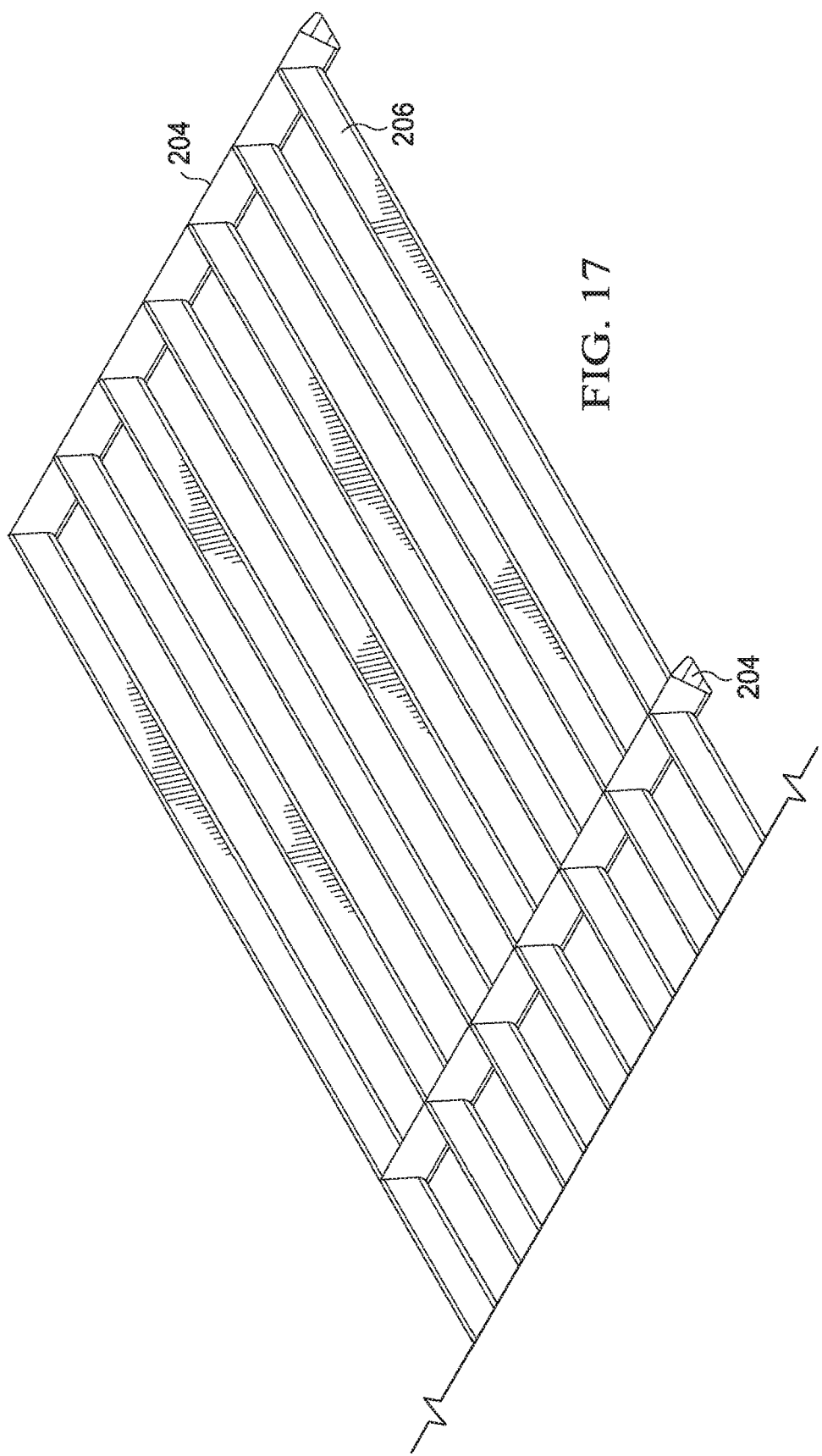
FIG. 17 is a perspective cutaway view of a portion of the upper cooking grate of FIG. 16.

FIG. 16 is a perspective view of an upper portion 200A of the multi-part cooking grate 200 of FIG. 13. FIG. 17 is a perspective cutaway view of a portion of an upper cooking grate 200A of FIG. 16, and FIG. 18 is a close-up end cutaway view of a portion of the upper cooking grate 200A of FIG. 16.

Figure 19:
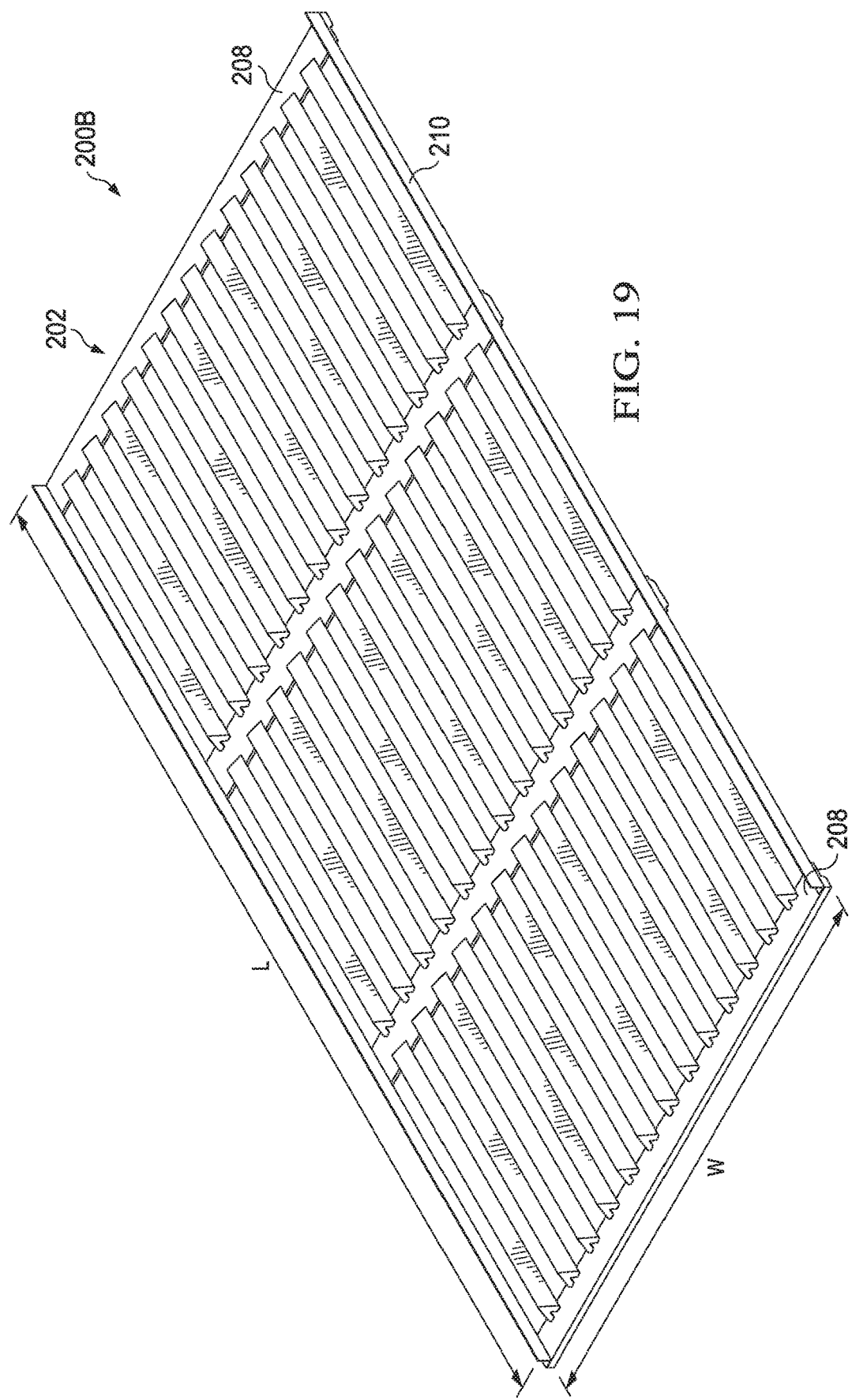
FIG. 19 is a perspective view of a lower portion of the multi-part cooking grate of FIG. 13.

FIG. 19 is a perspective view of a lower portion 200B of the multi-part cooking grate 200 of FIG. 13. FIG. 20 is a perspective cutaway view of a portion of the lower cooking grate 200B of FIG. 19, and FIG. 21 is a close-up end cutaway view of a portion of the lower cooking grate of FIG. 19.

FIGS. 13-21 taken together fully illustrate another embodiment of a cooking grate 200 that is somewhat similar in function to the cooking grate 100 previously described. The cooking grate 200 comprises the upper grating 200A (FIG. 16) and the lower grating 200B (FIG. 19). From the inset view of FIG. 14, it can be seen how upper V-shaped cooking members 206 overlap with lower V-shaped cooking members 210. With reference to FIG. 15, it can be seen how relatively little air space is left between the V-shaped cooking members 206 and 210. Therefore, in the configuration shown in FIGS. 13, 14, and 15, a relatively large amount of heating of food on the cooking surface 202 will be by radiative heating.

Figure 18:
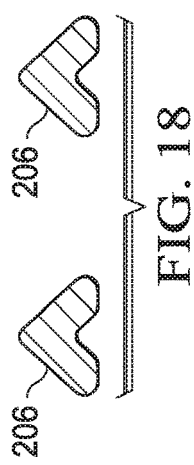
FIG. 18 is a close-up end cutaway view of a portion of the upper cooking grate of FIG. 16.

With reference to FIGS. 16-18, the upper sub-grating 200A can be seen. FIGS. 17 and 18 particularly illustrate how a relatively large amount of air space remains between adjacent V-shaped cooking members 206. Thus in the configuration of FIG. 16, a relatively large amount of heating will occur by convection. In the present embodiment the V-shaped cooking members 206 are retained in a fixed relationship relative to one another by upper cross members 204.

Referring now to FIGS. 19-21, the lower sub-grating 200B can be seen. Similar to the upper sub-grating 200A, the lower sub-grating 200B connects V-shaped cooking members 210 in a fixed relationship relative to one another by lower cross members 208. As with the upper sub-grating 200A, the lower sub-grating 200B will provide for a relatively large amount of convective heating owing in part to the relatively large amount of air space between adjacent V-shaped cooking members 210.

As with previous embodiments, it can be seen that the cooking surface 202 may be configured as shown in FIG. 13, combining both of the upper sub-grate 200A and the lower sub-grate 200B to provide a cooking surface 202 that is heated substantially by radiative heating. In this configuration the lower sub-grate 200B, with its cooking members 210 interrupted along their length L, allows for the cross members 204 of upper sub-grating 200A to rest upon the cross members 208 of sub-grating 200B. Movement between the sub-gratings 200A, 200B along length L is prevented by the cross members 204 bearing against the interrupted cooking members 210. Movement along with width W is prevented by the adjacent cooking members 210 and 208 when assembled as shown in FIG. 13.

The upper sub-grating 200A and/or the lower sub-grating 200B can be used alone and will provide a heating of surface 202 with a greater amount of convection heating relative to radiant heating as compared to the configuration of FIG. 13. As with previous embodiments, the spacing between the V-shaped members 206 and the V-shaped members 210 may not be the same. This may be accomplished, for example, by varying the size of the V-shaped cooking members 206 relative to the V-shaped cooking members 210. This allows the upper sub-grate 200A, the lower sub-grating 200B, and the combined grating 200 to each have different cooking characteristics. The upper sub-grating 200A and lower sub-grating 200B are user configurable. A user can vary the cooking characteristics of the cooking surface 202 by utilizing the combined grate 200 as shown in FIG. 13, or either of the sub-grates 200A, 200B.

The grate 200 may be made from cast or forged material, metal, or ceramic. In some embodiments a coating (e.g., ceramic or porcelain) may be applied to all or a portion of the grate 200. As with previous embodiments, the dimensions of the cooking surface 202 are meant to be variable such that existing gas, charcoal, electric, or other grills can be retro-fitted to utilize the devices of the present disclosure. It is also understood that the various cooking members described herein may not be V-shaped in all embodiments. To greater or lesser degrees, other cooking member shapes, such as those that are round or rectilinear in cross-section, function with the devices of the present disclosure.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A multi-part cooking grate comprising:
  a first upper sub-grate having a first plurality of cooking members retained in a fixed relationship relative to one another by at least one upper cross-member, the first upper sub-grate defining a first cooking surface characterized by a first horizontal spacing between adjacent ones of the first plurality of cooking members; and
  a second lower sub-grate having a second plurality of cooking members retained in a fixed relationship relative to one another by at least one lower cross member, the second lower sub-grate defining a second cooking surface characterized by a second horizontal spacing between adjacent ones of the plurality of cooking members;
  wherein the first and second sub-grates are configured to fit together such that their respective cooking members interfit to define a third cooking surface characterized by a third non-overlapped horizontal spacing between adjacent respective cooking members and that heats with a relatively high degree of radiant heating relative to convective heating; and
  wherein the first and second cooking surfaces heat with a relatively low degree of radiant heating relative to convective heating
  wherein the at least one upper cross member retains the first plurality of cooking members by a plurality of cutouts that receive a respective cutout portion of each of the first plurality of cooking members;
  wherein the at least one lower cross member retains the second plurality of cooking members by a plurality of cutouts that receive a respective cutout portion of each of the first plurality of cooking members; and
  wherein the first and second sub-grates are separable without tools and without altering spacing of their respective first plurality of cooking member and second plurality of cooking members.

2. The grate of claim 1, wherein the first upper sub-grate has a plurality of upper cross members that form upper end caps for its plurality of cooking members and the second lower sub-grate has a plurality of lower cross members that form lower end caps for its plurality of cooking members.

3. The grate of claim 2, wherein the lower end caps nest within the upper end caps when the first and second sub-grates are fitted together.

4. The grate of claim 3, wherein the respective cooking members are retained in a fixed relationship with the respective end caps such that the end caps prevent movement between the cooking members along a length thereof.

5. The grate of claim 1, wherein the cooking members of the lower sub-grate are interrupted to receive the cross members of the upper sub-grate when the cross members of the upper sub-grate rest upon the cross members of the lower sub-grate.

6. A multi-part cooking grate comprising:
  a first upper sub-grate having a first plurality of cooking members retained in a fixed relationship relative to one another by at least one upper cross-member attached to the ends of the first plurality of cooking members, the first upper sub-grate defining a first cooking surface characterized by a first spacing between adjacent ones of the first plurality of cooking members; and
  a second lower sub-grate having a second plurality of cooking members retained in a fixed relationship relative to one another by at least one lower cross member attached to the ends of the second plurality of cooking members, the second lower sub-grate defining a second cooking surface characterized by a second horizontal spacing between adjacent ones of the plurality of cooking members;
  wherein the first and second sub-grates are configured to fit together such that their respective cooking members interfit to define a third cooking surface characterized by a third spacing between adjacent respective cooking members and that heats with a relatively high degree of radiant heating relative to convective heating; and
  wherein the first and second cooking surfaces heat with a relatively low degree of radiant heating relative to convective heating; and
  wherein the first and second pluralities of cooking members comprise inverted single V shapes not having any adjacent parallel portions when configured in any of the first, second, or third cooking surfaces; and
  wherein the first and second sub-grates are separable without tools and without altering spacing of their respective first plurality of cooking member and second plurality of cooking members.

7. The grate of claim 6, wherein the lower cross member of the lower sub-grate nests within the upper cross member of the upper sub-grate when the upper and lower sub-grate are interfitted.

8. The grate of claim 7, wherein the upper cross member of the upper sub-grate has cooperating recesses to fit the first plurality of cooking members of the lower sub-grate when nested with the lower cross member of the lower sub-grate.

9. The grate of claim 6, wherein the first plurality of cooking members of the upper sub-grate have ends with a portion removed to be sized to fit into holes defined in the upper cross member.

10. The grate of claim 6, wherein the second plurality of cooking members of the lower sub-grate have ends with a portion removed to be sized to fit into holes defined in the lower cross member.

11. The grate of claim 6, wherein a spacing between the cooking members of the upper sub-grate differs from a spacing between the cooking members of the lower sub-grate so as to create a different degree of convective heating between the upper sub-grate and the lower sub-grate.

12. A multipart cooking grate comprising:
  a lower sub-grate with a first plurality of V-shaped cooking members running along a length of the lower sub-grate and having a first predetermined spacing between the first plurality cooking members along a width of the lower sub-grate; and
  an upper sub-grate with a second plurality of V-shaped cooking members running along a length of the lower sub-grate and having a second predetermined spacing between the second plurality of cooking members along a width of the upper sub-grate;
  wherein the first predetermined spacing accommodates a width of each of the second plurality of cooking members and the second predetermined spacing accommodates a width of each of the first plurality of cooking members such that the upper and lower sub-grates may be nested to create a first cooking surface comprising the first and second plurality of cooking members in an interfitted alternating relationship producing a relatively high degree of radiant heat compared to convective heat; and wherein each of the upper and lower sub-grate individually provide a second cooking surface with a relatively high degree of convective heat compared to radiant heat;

wherein upper and lower cross members retaining the upper sub-grate V-shaped cooking members in the first predetermined spacing and the lower sub-grate V-shaped cooking members in the second predetermined spacing, respectively, nest to prevent movement between the upper and lower sub-grates along their length;

wherein the at least one upper cross member retains the first plurality of cooking members by a plurality of cutouts that receive a respective cutout portion of each of the first plurality of cooking members; and wherein the at least one lower cross member retains the second plurality of cooking members by a plurality of cutouts that receive a respective cutout portion of each of the first plurality of cooking members.

13. The grate of claim 12, wherein the first and second predetermined spacing are different such that, individually, the upper and lower sub-grates provide different degrees of convective heat relative to radiant heat.

14. The grate of claim 12, wherein the upper and lower sub-grates each have at least one upper and lower cross member, respectively, that retains the respective cooking members in the first and second predetermined spacing.

15. The grate of claim 12, wherein the upper and lower sub-grates each have a plurality of upper and lower cross members, respectively, and the first plurality of lower cooking members are interrupted to accommodate at least one of the plurality of upper cross members when the upper sub-grate is placed upon the lower sub-grate.

* * * * *